Patented Mar. 31, 1953

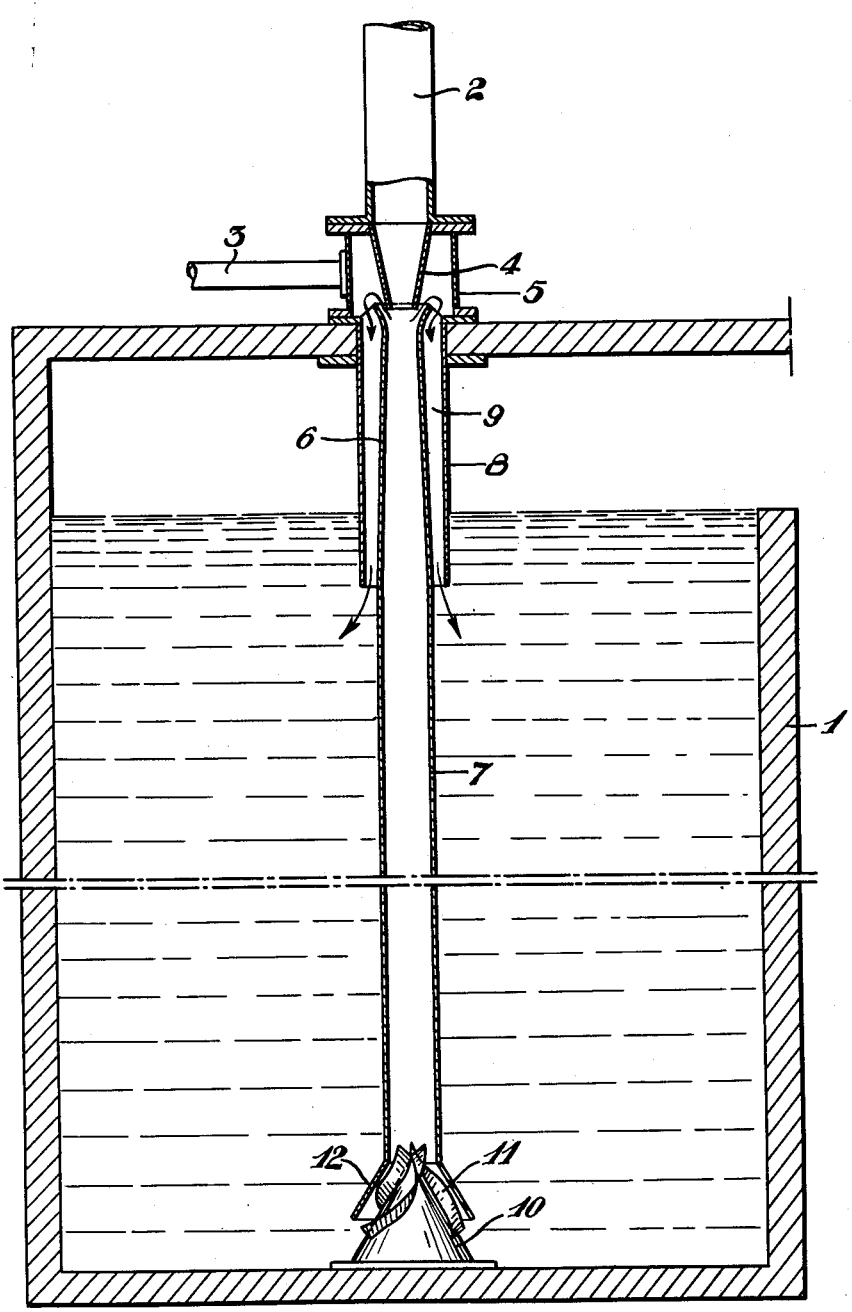

2,633,344

UNITED STATES PATENT OFFICE 2,633,344

EMULSIFIER FOR THE INTIMATE MIXING OF A LIQUID WITH A GAS

Boris Rekk, Uccle-Brussels, Belgium, assignor to Societe d'Epuration et d'Entreprises, Societe Anonyme, Uccle-Brussels, Belgium, a Belgian company Application January 28, 1949, Serial No. 73,398
In Belgium August 6, 1948

2 Claims. (Cl. 261—76)

The present invention has for its object an emulsifier apparatus adapted to produce an intimate mixing of a liquid with a gas and it is particularly applicable to emulsifiers of the type used in plants providing for the sterilisation of a liquid through ozone or the like gases.

In such apparatuses, a disadvantage is present in that when the pump feeding water or the like liquid stops operating, the mixture of liquid and gas may be urged back into the gas feeding pipe, which may damage the gas or ozone producing apparatus.

The present invention has for its object to remove this disadvantage and to eliminate the risk of such damage. It consists of an anti-back flow arrangement comprising a sheath surrounding the Venturi-shaped part which receives the mixture of liquid and gas so as to produce a free space through which the mixture may flow without any danger of a reflux towards the pipe feeding ozone or the like gas.

The invention has also for its object to provide means ensuring a better diffusion of the mixture as it rises in the mixing or contact column and to this purpose there is provided at the bottom or near the bottom of said column a stationary preferably conical member that carries fins defining helical grooves and allows the mixture to receive a gyratory movement as it rises.

The single figure of accompanying drawing is a sectional view illustrating a self-contacting tank provided with an emulsifier designed in accordance with the invention.

A description of this arrangement will now be given with reference to said drawing by way of exemplification and by no means in a limiting sense.

In the drawing, I designates the self-contacting tank, 2 the liquid feeding pipe and 3 the pipe admiting ozone or the like gas.

The emulsifier includes a Venturi-shaped part of which the upper component 4 forms an extension of the liquid feeding pipe 2 inside the casing 5 to which is connected the gas feeding pipe 3. The other component 6 of the Venturi-shaped part receiving the mixture of liquid and gas is located at the upper end of the vertical pipe 7 extending inside the tank I down to the immediate proximity of the bottom of said column.

According to the invention, there is provided around said component 6 a sheath 8 providing a free annular space 9 through which the mixture of liquid and gas may, in case of stoppage of the liquid feeding pump, follow the path shown by the arrows in order to escape towards the mass of liquid contained in the tank I on the outside of the pipe 7 without any portion of the mixture being possibly urged into the gas feeding pipe 3.

A further feature of the invention consists in that there is provided at the lower end of the pipe 7 a member 10 of conical shape resting on the bottom and provided with helically shaped fins 11 defining correspondingly shaped channels.

On the other hand, the pipe 7 opens at its lower end under the form of a downwardly flaring cone 12 surrounding the upper portion of the solid cone 10.

It will be readily understood that under such conditions, the liquid is submitted as it rises to a gyratory movement ensuring a better diffusion of the gas in the liquid.

What I claim is:

1. A gas-liquid treating apparatus of the type wherein liquid is pumped into a vessel via one pipe and gas is fed thereinto via a second pipe, including an emulsifier of the Venturi-type comprising an upper input section through which the liquid is pumped in and a lower output section terminating below the liquid surface within the vessel, said two Venturi-sections being separated from each other by a relatively large annular opening, said emulsifier being likewise provided with a connection from the gas feed pipe for admitting gas into proximity to said large annular opening, whereby both gas and air are mixed and enter said lower Venturi-section, and an antiflowback arrangement comprising a sheath surrounding said lower section of the venturi, said sheath also forming a large annular space around the lower Venturi-section, and defining together with said section a space through which said mixture can escape without any danger of a reflux towards said liquid feed pipe for the gas, when the pump supplying liquid to the apparatus stops.

2. In a venturi emulsifying apparatus of the type having a liquid feeding pump, the combination which comprises: a tank, a pipe in communication with said tank, said pipe extending inside said tank to a point in immediate proximity to the bottom of said tank, a pipe for feeding liquid to said tank, a pipe for feeding gas to said tank, a Venturi-shaped element comprising two component sections, the first component section forming an extension of said pipe for feeding liquid, and the second component section being in communication with and positioned so as to form an extension of said pipe which extends inside said tank and which receives the liquid-gas mixture, said two Venturi-sections being separated from each other by a relatively large annular opening, said combination also including an anti-backflow arrangement comprising a sheath surrounding said second component section and defining large annular space around said second section, through which the mixture can escape without any danger of reflux towards said feed pipe for the gas when the pump supplying liquid to the apparatus stops.

BORIS REKK.

REFERENCES CITED

The following references are of record in the file of this patent:

UNITED STATES PATENTS

| Number | Name | Date |
|---|---|---|
| 1,594,947 | Hartman et al. | Aug. 3, 1926 |
| 1,810,131 | Daily | June 16, 1931 |
| 1,964,838 | Weinberg | July 3, 1934 |
| 2,050,771 | Wait | Aug. 11, 1936 |
| 2,328,414 | Beyer | Aug. 31, 1943 |